C. E. PATRIC.
FURROW OPENER FOR SEEDING MACHINES.
APPLICATION FILED AUG. 9, 1915.
1,229,194.
Patented June 5, 1917.
2 SHEETS—SHEET 2.
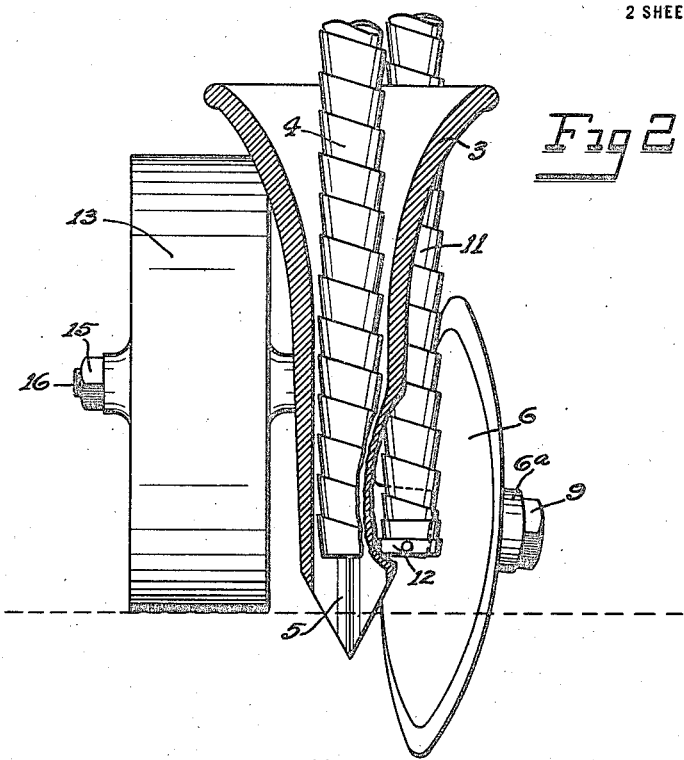
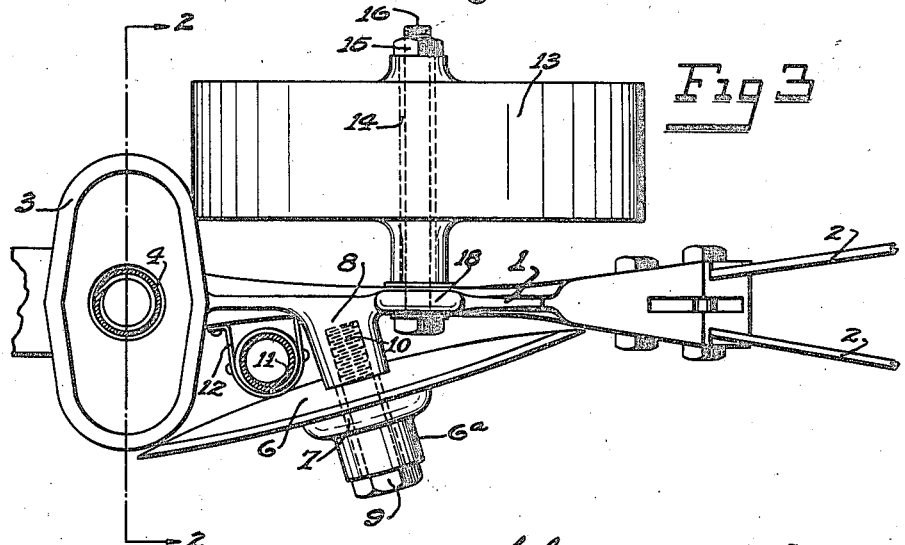
Witnesses
Edwin L. Beale
Chas. J. Welch
Inventor
Charles E. Patric
By
Attorneys

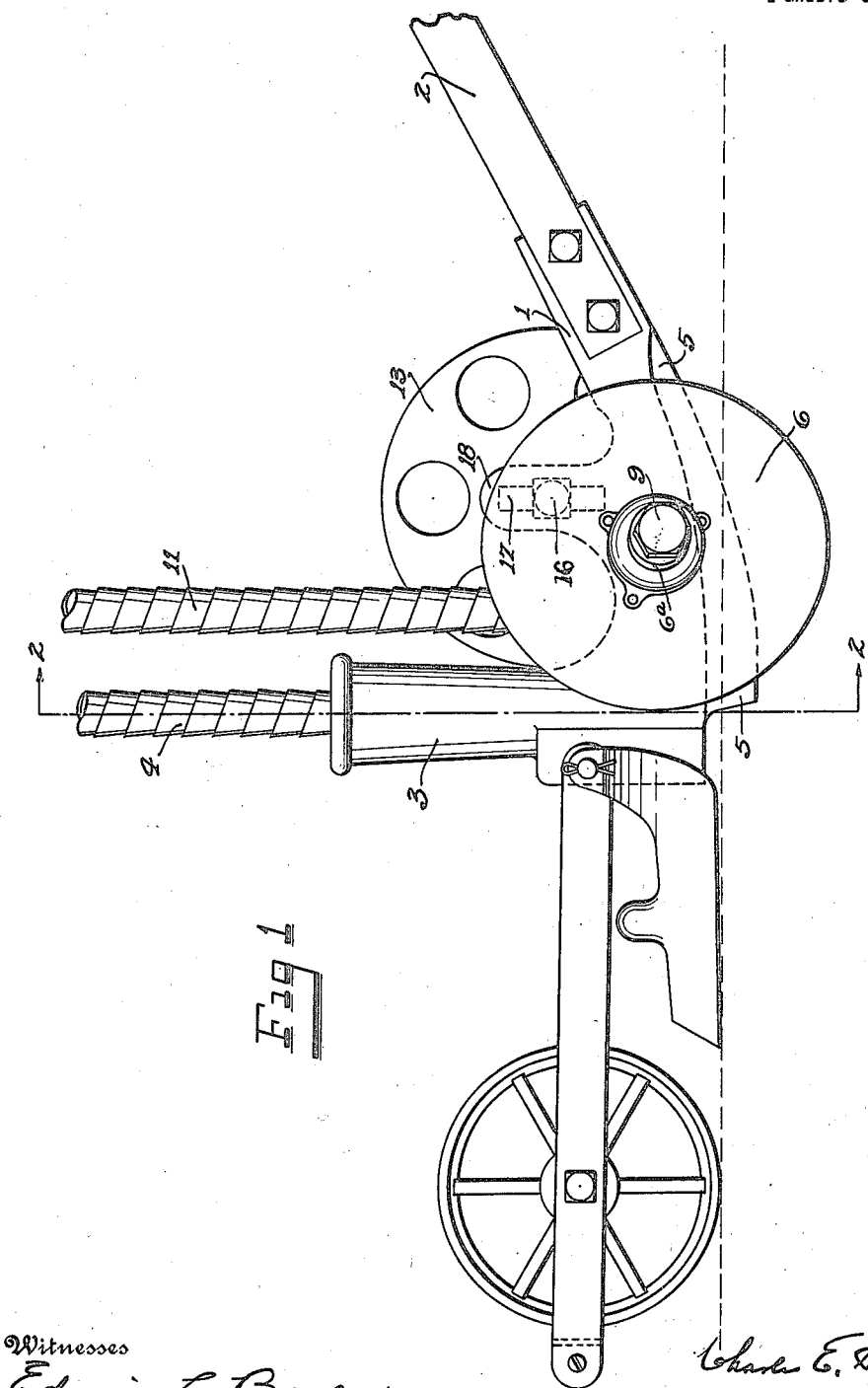

UNITED STATES PATENT OFFICE.

CHARLES E. PATRIC, OF SPRINGFIELD, OHIO.

FURROW-OPENER FOR SEEDING-MACHINES.

1,229,194.

Specification of Letters Patent.

Patented June 5, 1917.

Application filed August 9, 1915. Serial No. 44,493.

*To all whom it may concern:*

Be it known that I, CHARLES E. PATRIC, a citizen of the United States, residing at Springfield, in the county of Clark and State of Ohio, have invented certain new and useful Improvements in Furrow-Openers for Seeding-Machines, of which the following is a specification.

My invention relates to improvements in furrow openers for seeding machines, and it more particularly relates to a furrow opener especially adapted for opening a furrow for the deposit of seed and also fertilizer.

The object of the invention is to provide a furrow opener which will sow the fertilizer in a separate trench or furrow from that in which the seed is deposited and at a greater depth so that the seed will not be in contact with the fertilizer after they are deposited in the ground and thus eliminate the danger which has been experienced from the fertilizer interfering with the proper germination of the seed when brought in direct contact therewith.

A further object of the invention is to provide a simple and effective furrow opening device for the purpose of opening a double trench or furrow, for the purpose above stated.

In the accompanying drawings:—

Figure 1 is a side elevation of a furrow opener embodying my improvements.

Fig. 2 is a vertical section, the section being on the line 2—2 of Fig. 1 and also on the line 2—2 of Fig. 3.

Fig. 3 is a top plan.

In the said drawings, 1 represents a support, to the forward portion of which is attached the usual drag bars 2 and to the rear end of which is preferably integrally formed the usual boot or conduit 3 into which leads the flexible tube 4 commonly employed for conveying the seed from the seed distributers to the furrow opening device.

Connected with the support 1 are two furrow opener elements, arranged side by side but in different planes relatively to the line of travel. One of these elements is shown in the present case in the nature of a shoe or runner 5 formed on the under side of the support 1, said runner beginning at a point immediately back of the drag bar attachment and terminating at a point immediately in front of the lower end of the boot or conduit 3, this shoe or runner 5 being the furrow opener which opens the furrow for the seed.

The other furrow opener is here shown as a concavo-convex disk 6 of the ordinary form, this disk being journaled upon a sleeve or bushing 7, (shown in dotted lines in Fig. 3), which is clamped between the outer end of an angularly-extending boss 8, preferably formed integral with the support 1, and the head 9 of a bolt 10 (also shown in dotted lines in Fig. 3) which is threaded in the said boss 8; the said head 9 embracing the end of the hub 6ª of the disk so as to retain it against lateral displacement. This disk is for the purpose of opening a trench or furrow for the reception of the fertilizer, and it will be seen that the disk is not only set in a different plane relatively to the line of travel from that of the furrow opener 5, but that its cutting edge is located considerably below that of the said furrow opener 5 so as to open a furrow of greater depth than that opened by the shoe 5. A flexible tube 11, leading from the fertilizer distributer, has its lower end attached to a loop 12 secured to the support 1 back of the center of the disk on the convex side thereof so that the fertilizer from the tube 11 will drop into the trench or furrow formed by said disk.

Rotatably secured to the opposite side of the support from the disk 6 is a gage wheel 13, this wheel 13 being journaled upon a bushing or sleeve 14, shown in dotted lines in Fig. 3, clamped between the support and the nut 15, said nut being screw-threaded on the end of the spindle 16 having a connection with said support. As shown in dotted lines in Fig. 1, the spindle 16 is secured in a slotted opening 17 in the upwardly projecting portion 18 of the support so that the parts may be adjusted to regulate the depth of planting.

From the construction described it will be seen that two distinct and separate furrows are opened, one for the reception of the seed and one for the fertilizer, the furrow for the fertilizer being the deeper of the two so that the fertilizer will be deposited well beneath the seed which will be separated therefrom by sufficient earth to fully protect the seed from any harmful action of the fertilizer thereon. In the construction of these furrow openers, the difference in the depth of penetration of the respective furrow openers proper will depend upon the nature of the seed to be sown in connection therewith. The furrow opener shown in the drawings is one designed more particularly for the sowing of such seed as onion seed in which it has been found that the best depth for the seed is about one-half inch and that for the fertilizer about two inches, so that as a rule the fertilizer will be deposited about four times as deep as the seed.

Having thus described my invention, I claim:—

1. In a device of the character described, a support, a furrow opening shoe connected with said support, and a furrow opening disk journaled on said support, said shoe and disk being arranged in different planes relatively to the line of travel so as to open two separate furrows, said disk being arranged to open a furrow of greater depth than said shoe.

2. In a device of the character described, a support, a furrow opening shoe arranged along the bottom of said support, a furrow opening disk journaled at the side of said support, the arrangement being such that said shoe and disk will open two separate furrows, said disk being arranged to open a furrow of greater depth than said shoe, a seed conduit at the rear end of said shoe, and a fertilizer conduit associated with said disk.

3. In a device of the character described, a support, two separate furrow opening members connected with said support, the furrow opening portions of said members being located in different planes relatively to the line of travel so as to open two distinct furrows, one of said members being arranged to open a furrow of greater depth than the other, and means for feeding seed into one of the said furrows and fertilizer into the other.

In testimony whereof, I have hereunto set my hand this 19th day of July 1915.

CHARLES E. PATRIC.

Witness:
 CHAS. I. WELCH.